(12) United States Patent
Baughman et al.

(10) Patent No.: US 11,275,990 B2
(45) Date of Patent: Mar. 15, 2022

(54) INCIDENT PREDICTION AND RESPONSE USING DEEP LEARNING TECHNIQUES AND MULTIMODAL DATA

(71) Applicant: International Business Machines Corporation, Armonk, NY (US)

(72) Inventors: Aaron K. Baughman, Silver Spring, MD (US); Christian Eggenberger, Wil (CH); Andrea I. Martin, Munich (DE); Daniel S. Stoessel, Gwatt (CH); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 16/275,402

(22) Filed: Feb. 14, 2019

(65) Prior Publication Data

US 2019/0180172 A1    Jun. 13, 2019

Related U.S. Application Data

(63) Continuation of application No. 14/868,999, filed on Sep. 29, 2015, now Pat. No. 10,289,949.

(51) Int. Cl.
*G06N 3/04* (2006.01)

(52) U.S. Cl.
CPC ......... *G06N 3/0472* (2013.01); *G06N 3/0445* (2013.01)

(58) Field of Classification Search
None
See application file for complete search history.

(56) References Cited

U.S. PATENT DOCUMENTS

| 7,737,837 | B2 | 6/2010 | Donovan |
| 8,547,249 | B2 | 10/2013 | David |
| 9,870,534 | B1 | 1/2018 | Wu |
| 2009/0027493 | A1 | 1/2009 | Amar |
| 2012/0130937 | A1 | 5/2012 | Leon, Jr. |
| 2013/0151202 | A1 | 6/2013 | Denny |
| 2013/0311219 | A1 | 11/2013 | Zvi |

(Continued)

OTHER PUBLICATIONS

"Health", Apple iOS 8, Printed on: Jul. 13, 2015, Copyright © 2015 Apple Inc., 8 pages, <http://www.apple.com/ios/whats-new/health/>.

(Continued)

*Primary Examiner* — Alan Chen
(74) *Attorney, Agent, or Firm* — Stephanie L. Carusillo

(57) ABSTRACT

In an approach to incident prediction and response, one or more computer processors receive one or more alerts corresponding to an incident. The one or more computer processors aggregate the one or more alerts with additional data corresponding to the incident. The one or more computer processors feed the aggregated data into a prediction model, where training of the prediction model uses associated independent stacked Restricted Boltzmann Machines utilizing one or more supervised methods and one or more unsupervised methods. The one or more computer processors determine, based, at least in part, on one or more calculations by the prediction model, at least one probability of the incident. The one or more computer processors determine whether the at least one probability exceeds a pre-defined threshold. In response to determining the at least one probability exceeds a pre-defined threshold, the one or more computer processors send at least one notification.

20 Claims, 4 Drawing Sheets

(56) References Cited

U.S. PATENT DOCUMENTS

| | | |
|---|---|---|
| 2014/0337862 A1 | 11/2014 | Valencia |
| 2015/0370994 A1 | 12/2015 | Madan |
| 2017/0000422 A1 | 1/2017 | Moturu |
| 2017/0065230 A1 | 3/2017 | Sinha |
| 2017/0091617 A1 | 3/2017 | Baughman |
| 2018/0033220 A1 | 2/2018 | Pal |

OTHER PUBLICATIONS

"Restricted Boltzmann machine", From Wikipedia, the free encyclopedia, Last modified on Mar. 5, 2015, Captured on Jun. 24, 2015, pp. 1-5, <https://en.wikipedia.org/wiki/Restricted_Boltzmann_machine>.

"The Dash-Wireless Smart in Ear Headphones", Kickstarter, Captured on: Jun. 24, 2015, pp. 1-22, <http://web.archive.org/web/20150404120959/https://www.kickstarter.com/projects/hellobragi/the-dash-wireless-smart-in-ear-headphones/description>.

"Wearable Biometric Earphones for Fitness and Health", Kickstarter, Sensogram Technologies, Inc., Captured on Jun. 24, 2015, pp. 1-26, <http://web.archive.org/web/20150629135658/https://www.kickstarter.com/projects/sensogram/sensotrack-best-wearable-mobile-health-and-activit?ref=discovery>.

Bagnoli et al., "D1: Characterization and typologies of CAPs", Internet Science, May 8, 2015, © The EINS Consortium, pp. 1-31.

Gloor, Peter A., "Swarm Creativity: Competitive Advantage through Collaborative Innovation Networks", Amazon, Oxford University Press; 1 edition (Jan. 5, 2006), p. 60, <http://www.amazon.com/Swarm-Creativity-Competitive-Collaborative-Innovation/dp/0195304128>.

Lasecki et al., "Real-Time Crowd Labeling for Deployable Activity Recognition", CSCW '13, Feb. 23-27, 2013, San Antonio, Texas, USA, Copyright 2013 ACM, pp. 1203-1212.

Stollberg et al., BEATE, "The Use of Social Media within the Global Disaster Alert and Coordination System (GDACS)", WWW 2012 Companion, Apr. 16-20, 2012, Lyon, France, ACM, pp. 703-706.

Tolentino et al., "Disaster Relief in Laguna: A Geographical Information System Through Crowdsourcing on Facebook", CMSC 190 Special Problem, Institute of Computer Science, printed on: Jul. 10, 2015, © 2012 ICS University of the Philippines Los Baños, pp. 1-6.

Uhrmann et al., "Task-based Guidance of Multiple UAV Using Cognitive Automation", Cognitive 2011: The Third International Conference on Advanced Cognitive Technologies and Applications, Copyright IARIA, 2011, printed on Jul. 10, 2015, ISBN: 978-1-61208-155-7, pp. 47-52.

IBM Appendix P, list of patents and patent applications to be treated as related, Filed Herewith, 2 pages.

INCIDENT PREDICTION AND RESPONSE USING DEEP LEARNING TECHNIQUES AND MULTIMODAL DATA

BACKGROUND OF THE INVENTION

The present invention relates generally to the field of machine learning, and more particularly to predicting and responding to an incident using deep learning techniques and multimodal data.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

An artificial neural network, often called an artificial neural net or neural net, is used in many applications to recognize a pattern or a function for which the neural net has been trained to recognize. An artificial neural network is a lattice of individual artificial neurons that are connected to each other. The artificial neurons are often arranged in layers in a lattice with the outputs of the neurons in a layer connected to the inputs of the neurons in a next layer. An artificial neuron is modeled on a biological neuron, which is comprised of dendrites that carry input signals (often originating in the outputs of other neurons) to a cell body that processes the inputs and produces an output signal on an axon. The signal on the axon is often an input to one or more synapses that each provide a connection to one or more dendrites (inputs) on other neurons.

A Restricted Boltzmann Machine (RBM) is a generative stochastic artificial neural network that can learn a probability distribution over its set of inputs. An RBM can be trained in either supervised or unsupervised ways, depending on the task. As the name implies, RBMs are a variant of Boltzmann machines, with the restriction that their neurons must form a bipartite graph: a pair of nodes from each of the two groups of units, commonly referred to as the "visible" and "hidden" units, respectively, may have a symmetric connection between them, and there are no connections between nodes within a group, i.e., connections only exist between the visible units of the input layer and the hidden units of the hidden layer; there are no visible-visible or hidden-hidden connections.

Once an RBM is trained, another RBM can be "stacked" atop of it to create a multilayer model. Each time another RBM is stacked, the input visible layer is initialized to a training vector, and values for the units in the already-trained RBM layers are assigned using the current weights and biases. The final layer of the already-trained layers is used as input to the new RBM. The new RBM is then trained with the procedure above, and the process can be repeated until some desired stopping criterion is met.

When a critical incident, such as a crime or a natural disaster, is about to occur, gathering data that could potentially prevent tangible and intangible damages or losses can be crucial. Data from static sensors, such as security monitors and motion sensors, may be available, but may also be limited in scope due to the expense of placing a number of sensors in close proximity to each other. Crowdsourcing is another method of producing data regarding a critical incident. Crowdsourcing can be defined as the process of obtaining needed services, ideas, or content by soliciting contributions from a large group of people, and especially from an online community. A request for data regarding the incident may be sent directly to devices in the vicinity of a potentially critical incident. In addition, data can be gleaned from postings on social networks. Data received from people, either via crowdsourcing or social networks, may, however, be unreliable, depending on a person's point of view. Data received from public officials, such as police and firefighters, is generally reliable, however, due to the small number of officials in the vicinity, the data is likely to be limited. There is a need for a cognitive system that can gather data regarding a potential critical incident from a plurality of sources, determine the probability that the incident will occur (or is occurring), and notify stakeholders, such as officials and bystanders, with information and instructions in order to minimize tangible and intangible damages.

SUMMARY

A first aspect of the present invention discloses a method including one or more computer processors receiving one or more alerts corresponding to an incident. The one or more computer processors aggregate the one or more alerts with additional data corresponding to the incident. The one or more computer processors feed the aggregated data into a prediction model, where training of the prediction model uses associated independent stacked Restricted Boltzmann Machines utilizing one or more supervised methods and one or more unsupervised methods. The one or more computer processors determine, based, at least in part, on one or more calculations by the prediction model, at least one probability of the incident. The one or more computer processors determine whether the at least one probability exceeds a pre-defined threshold. In response to determining the at least one probability exceeds a pre-defined threshold, the one or more computer processors send at least one notification.

A second aspect of the present invention discloses a computer program product including one or more computer readable storage device and program instructions stored on the one or more computer readable storage device. The stored program instructions include program instructions to receive one or more alerts corresponding to an incident. The stored program instructions include program instructions to aggregate the one or more alerts with additional data corresponding to the incident. The stored program instructions include program instructions to feed the aggregated data into a prediction model, where training of the prediction model uses associated independent stacked Restricted Boltzmann Machines utilizing one or more supervised methods and one or more unsupervised methods. The stored program instructions include program instructions to determine, based, at least in part, on one or more calculations by the prediction model, at least one probability of the incident. The stored program instructions include program instructions to determine whether the at least one probability exceeds a pre-defined threshold. In response to determining the at least one probability exceeds a pre-defined threshold, the stored program instructions include program instructions to send at least one notification.

A third aspect of the present invention discloses a computer system including one or more computer processors and one or more computer readable storage device, where the program instructions are stored on the one or more computer readable storage device for execution by at least one of the one or more computer processors. The stored program instructions include program instructions to determine, based, at least in part, on one or more calculations by the prediction model, at least one probability of the incident. The stored program instructions include program instructions to determine whether the at least one probability exceeds a pre-defined threshold. In response to determining the at least one probability exceeds a pre-defined threshold, the stored program instructions include program instructions to send at least one notification.

In another aspect, training the prediction model includes passing, by one or more computer processors, an object vector to a Restricted Boltzmann Machine (RBM), training, by the one or more computer processors, the RBM with one or more supervised methods or with one or more unsupervised methods, and placing, by the one or more computer processors, the trained RBM in one or more stacks of trained RBMs. Training the prediction model also includes determining, by the one or more computer processors, whether passing data through the one or more stacks of RBMs creates a desired recall, creating, by the one or more computer processors, one or more associative layers of stacked RBMs, and performing, by the one or more computer processors, supervised training on the one or more associative layers. Training the RBM with a supervised method is advantageous because a supervised learning algorithm analyzes the training data and produces an inferred function, which can be used for mapping new examples. Training the RBM with an unsupervised method is advantageous for use in model training when the only data available is unlabeled data.

In yet another aspect, training the RBM with one or more supervised methods or with one or more unsupervised methods includes determining, by one or more computer processors, whether a chronological order of the RBM is odd or even. In response to determining the chronological order of the RBM is even, training, by the one or more computer processors, the RBM with one or more supervised methods, and in response to determining the chronological order of the RBM is odd, training, by the one or more computer processors, the RBM with one or more unsupervised methods. It is advantageous to determine whether the RBM is odd or even in order to equally integrate the training with both supervised and unsupervised methods.

In yet another aspect, placing the trained RBM in one or more stacks includes creating, by the one or more computer processors, a pair of one odd RBM and one even RBM, and placing, by the one or more computer processors, the pair of RBMs in one or more stacks. It is advantageous to include RBMs trained by both supervised and unsupervised methods because it is an effective method for correlating different types of features from multimodal data. Using both supervised and unsupervised methods is also advantageous because it enables fine tuning of unsupervised training with supervised training results.

DETAILED DESCRIPTION

Embodiments of the present invention recognize that tangible and intangible damages and losses resulting from a critical incident may be minimized, or eliminated, by implementing a system that aggregates, i.e., collects and combines, data from a plurality of sources, predicts an occurrence of an incident and associated ramifications, and notifies stakeholders of status and instructions to minimize risk. The aggregated data may include any type of data corresponding to an incident such as a description of the incident, the location of the incident, the time of the incident, weather conditions in the area of the incident, current population of the area of the incident, historical accounts of similar incidents, schedules of public transportation and events in the area of the incident, status of security systems and personnel, etc. The aggregated data may include data received from an observer or bystander of the incident as well as data retrieved from other sources. Embodiments of the present invention further recognize that providing a system that receives data from observers and bystanders enables the observers and bystanders to help with an incident according to their abilities and without fear of being punished for a false alarm because the system calculates the probability of an incident. Embodiments of the present invention further recognize that providing a system that aggregates data from a plurality of sources minimizes the need for expensive security monitoring, both by devices and personnel. Embodiments of the present invention may also be used for training of authorities and citizens in the assessment and response to critical incidents. Implementation of embodiments of the invention may take a variety of forms, and exemplary implementation details are discussed subsequently with reference to the Figures.

Figure 1:
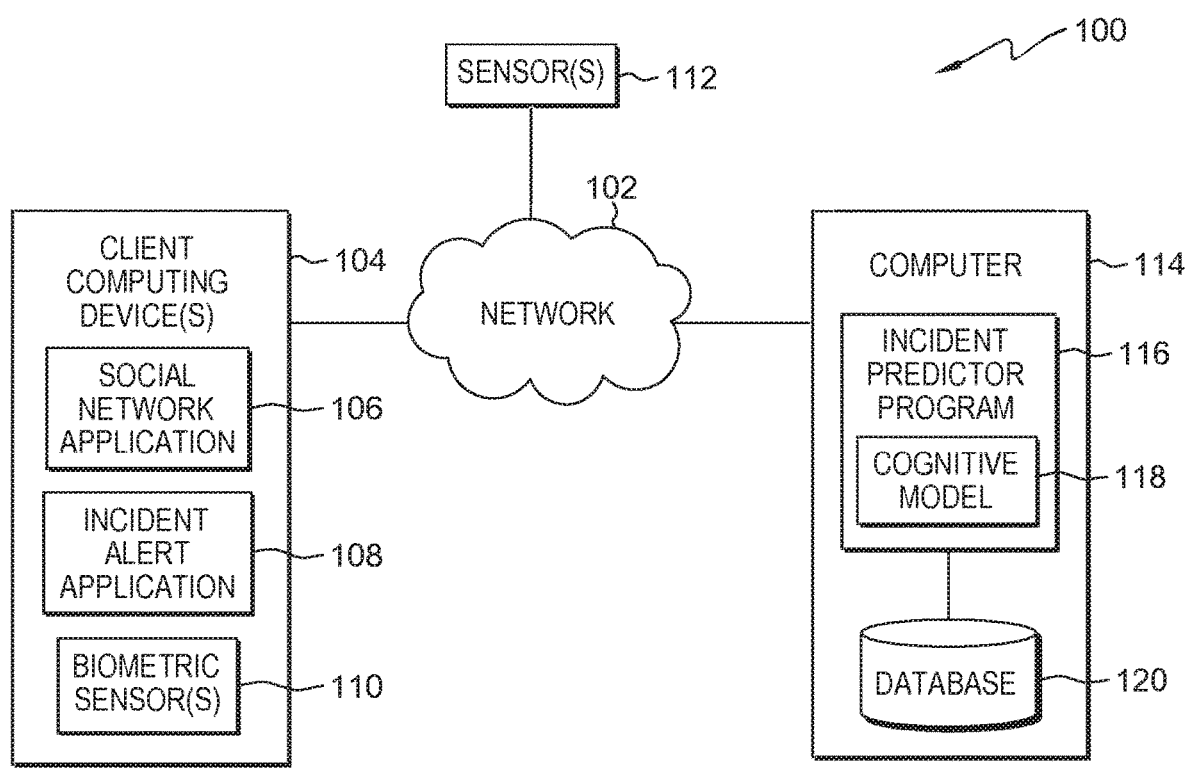
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes client computing device(s) 104 and computer 114, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device(s) 104, computer 114, and other computing devices (not shown) within computational environment 100.

Client computing device(s) 104 can be one or more of a laptop computer, a tablet computer, a smart phone, or any programmable electronic device capable of communicating with various components and devices within computational environment 100, via network 102. Client computing device(s) 104 can be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, client computing device(s) 104 represents any programmable electronic device or combination of programmable electronic devices capable of executing machine readable program instructions and communicating with other computing devices (not shown) within computational environment 100 via a network, such as network 102. Client computing device(s) 104 includes social network application 106, incident alert application 108, and biometric sensor(s) 110.

Social network application 106 is one or more of a plurality of platforms for building online social networks among people who share interests, activities, backgrounds, and/or real-life connections. Social network applications are web-based services that allow individuals to create a public or private profile, to create a list of users with whom to share connections, and to view and interact with the connections within the system. Social network applications may also include communication tools such as mobile connectivity, photo and video sharing, and blogging.

Incident alert application 108 is software that acts as a user interface between a user of client computing device(s) 104 and incident predictor program 116 on computer 114. Incident alert application 108 may be a computer program designed to permit a user to perform a group of coordinated functions, tasks, or activities with respect to incident predictor program 116. Incident alert application 108 may be mobile application software i.e., an app, which is a computer program typically designed to run on smart phones, tablet computers and other mobile devices. Incident alert application 108 enables a user to send an alert or a status message regarding a critical incident to incident predictor program 116. The advantage of a user being able to send alerts and status messages in response to an incident is the user can help with an incident according to the user's abilities. In an embodiment, incident alert application 108 enables a user to send an alert or status message anonymously. The advantage of a user being able to send alerts and status messages anonymously is the user can send an alert freely, without fear of being punished for a false alarm. Incident alert application 108 also enables a user to receive alerts, queries, and instructions regarding a critical incident from incident predictor program 116. The advantage of a user being able to receive alerts, queries, and instructions from incident predictor program 116 is the user can receive advanced warning of a critical incident and be prepared for the incident, as well as assist authorities with information corresponding to the incident by responding to queries. Critical, as referred to herein, implies dangerous, harmful, risky, or with the potential to cause damage or injury to people or property, as well as crucial or of decisive importance with respect to the outcome. Biometric sensor(s) 110 are one or more of a plurality of sensors designed to track biometric parameters of an associated user. Biometric parameters include, but are not limited to, heart rate, heart rate variability, gait, blood pressure, respiration rate, and oxygen saturation. Biometric sensor(s) 110 may also be able to detect or track a user's physical characteristic, such as height, weight, and age.

Sensor(s) 112 may be one or more transducers whose purpose is to sense, i.e., to detect, some characteristic of its environment. A transducer sensor, such as sensor(s) 112, detects events or changes in quantities and provides a corresponding output, generally as an electrical or optical signal. For example, a thermocouple converts temperature to an output voltage. Sensor(s) 112 may also be one or more cameras, microphones, or other recording devices that can capture information regarding a critical incident. In addition, sensor(s) 112 may be weather monitoring devices, such as thermometers, barometers, and anemometers, as well as seismometers.

Computer 114 can be a standalone computing device, a server computer, a computational grid, a management server, a web server, a mobile computing device, or any other electronic device or computing system capable of receiving, sending, and processing data. In other embodiments, computer 114 can represent a server computing system utilizing multiple computers as a server system, such as in a cloud computing environment. In another embodiment, computer 114 can be a laptop computer, a tablet computer, a netbook computer, a personal computer (PC), a desktop computer, a personal digital assistant (PDA), a smart phone, or any programmable electronic device capable of communicating with client computing device(s) 104, sensor(s) 112, and other computing devices (not shown) within computational environment 100 via network 102. In another embodiment, computer 114 represents a computing system utilizing clustered computers and components (e.g., database server computers, application server computers, etc.) that act as a single pool of seamless resources when accessed within computational environment 100. Computer 114 includes incident predictor program 116 and database 120. Computer 114 may include internal and external hardware components, as depicted and described in further detail with respect to FIG. 4.

Incident predictor program 116 aggregates one or more alerts from one or more observers of an incident or of a situation that may become a critical incident with information from other sources to evaluate the situation and recommend appropriate actions. Incident predictor program 116 receives alerts and associated metadata from users of incident alert application 108. Incident predictor program 116 aggregates associated alerts with applicable data stored in database 120, and elsewhere, thus creating incident information. Applicable data may be any information that may be of consequence to the incident or to people or property in proximity to the incident. Applicable data may include, but is not limited to, weather conditions in the area of the incident, current population of the area of the incident, historical accounts of similar incidents, schedules of public transportation and events in the area of the incident, status of security systems and personnel, and the like. Incident predictor program 116 feeds the incident information into a cognitive model that can predict probabilities and risks of an incident occurring and, if so, possible ramifications. If the predicted probabilities and risks of the incident exceed a threshold, then incident predictor program 116 notifies stakeholders. In the depicted embodiment, incident predictor program 116 resides on computer 114. In another embodiment, incident predictor program 116 may reside on client computing device(s) 104. In the embodiment, a user of client computing device(s) 104 may initiate incident predictor program 116 upon observing an incident. Incident predictor program 116 includes cognitive model 118. Incident predictor program 116 is depicted and described in further detail with respect to FIG. 3.

Cognitive model 118 utilizes deep learning techniques and multimodal data calculate predictions relative to critical incidents. Specifically, cognitive model 118 uses an approach that includes a neuromorphic algorithm that can be trained with supervised and unsupervised methods. In a preferred embodiment, cognitive model 118 utilizes associated independent stacked Restricted Boltzmann Machines (RBM) with both supervised and unsupervised methods. This technique is advantageous over conventional techniques because the training is very fast, thus saving time and computing resources. The technique is also advantageous because it requires less training exemplars. In addition, the technique is advantageous because it is an effective method for correlating different types of features from multimodal data. The technique is also advantageous because it enables fine tuning of unsupervised training with supervised training results. Cognitive model 118 assesses a situation by considering different factors which may be online or offline and available as structured or unstructured data and applying relative weights. A subject matter expert feeds a training set of data to cognitive model 118. In one embodiment, the data is labeled as "critical" or "not critical," enabling cognitive model 118 to learn what constitutes a critical incident or situation during offline training, prior to use. The training set of data includes examples of a plurality of incidents, likely outcomes of the incidents, and associated risks. Cognitive model 118 is trained to recognize the difference between, for example, a weather incident and a traffic incident. In addition, cognitive model 118 is trained to recognize the severity of an incident, such as the difference between a thunderstorm and a tornado. Cognitive model 118 learns from the training set of data to distinguish between likely and unlikely scenarios. Once trained, cognitive model 118 can assign a weight or probability to the occurrence of a critical incident based on the data aggregated by incident predictor program 116. Cognitive model 118 may also assign a weight or probability to risks to people and/or property associated with an incident, and to the positive or negative outcome of various actions taken by observers and stakeholders of the incident. The training of cognitive model 118 is depicted and described in further detail with respect to FIG. 2.

Database 120 resides on computer 114. In another embodiment, database 120 can reside anywhere in computational environment 100, provided that cognitive model 118 has access to database 120. A database is an organized collection of data. Database 120 can be implemented with any type of storage device capable of storing data and configuration files that can be accessed and utilized by computer 114, such as a database server, a hard disk drive, or a flash memory. Database 120 stores a plurality of data that may be useful in assessing a critical incident. For example, database 120 may store historical weather data. Database 120 may also store locations and calibration history of sensor(s) 112. Database 120 may store information regarding upcoming events and public transportation schedules. Database 120 may also store background information of users of incident alert application 108.

Figure 2:
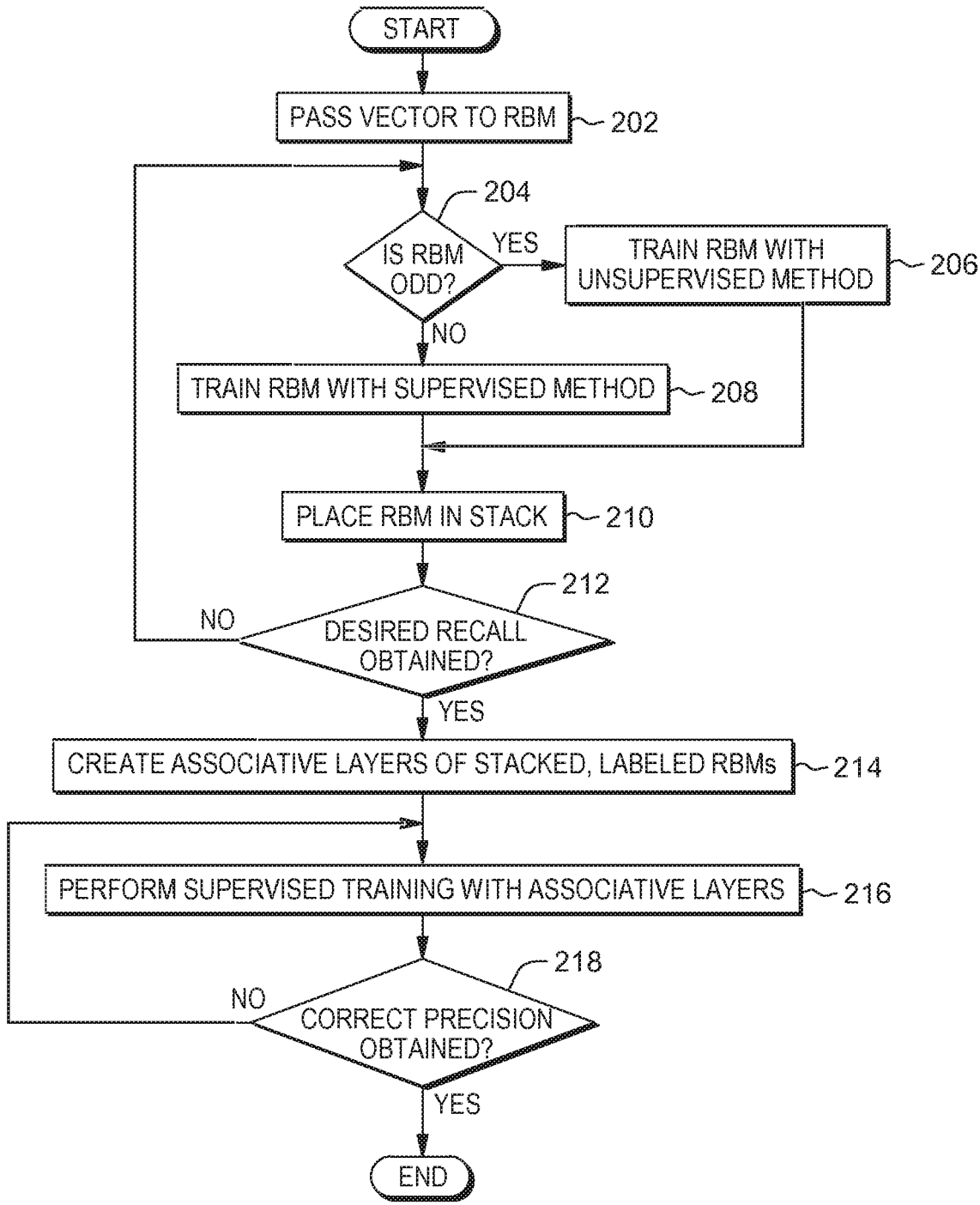
FIG. 2 is a flowchart depicting operational steps of a model training program, on a computer within the computational environment of FIG. 1, for training a cognitive model, in accordance with an embodiment of the present invention.

FIG. 2 is a flowchart depicting operational steps of model training program 200, on computer 114 within computational environment 100 of FIG. 1, for training cognitive model 118, in accordance with an embodiment of the present invention.

Model training program 200 passes a vector into a Restricted Boltzmann Machine (RBM) (step 202). Model training program 200 trains cognitive model 118 with both image feature vectors and textual feature vectors, where the vectors originate from feature extractors applied to multimodal data. In one embodiment, model training program 200 applies left sided associated independent stacked RBMs to image feature vectors and right sided associated independent stacked RBMs to textual feature vectors. The training results in the visible and hidden layers of the RBM learning features within the vector, whether the vector is an image feature vector or a textual feature vector.

Model training program 200 determines whether the RBM is odd (decision block 204). Model training program 200 utilizes both supervised and unsupervised methods, i.e., multimodal data. The advantage of using both supervised and unsupervised methods is because it is an effective method for correlating different types of features from multimodal data. Using both supervised and unsupervised methods is also advantageous because it enables fine tuning of unsupervised training with supervised training results. In order to equally integrate the training with both supervised and unsupervised methods, model training program 200 splits the RBMs chronologically into odd and even numbering. For example, $RBM_1$ is odd while $RBM_2$ is even. If the RBM is not odd, i.e., the RBM is even ("no" branch, decision block 204), then model training program 200 trains the RBM with a supervised method based on objects (step 208). As would be recognized by one skilled in the art, supervised learning is the machine learning task of inferring a function from labeled training data. The training data consists of a set of training examples. In supervised learning, each example is a pair consisting of an input object, typically a vector, and a desired output value or target. The goal is to learn a general rule that maps inputs to outputs. A supervised method is advantageous because a supervised learning algorithm analyzes the training data and produces an inferred function, which can be used for mapping new examples.

If the RBM is odd ("yes" branch, decision block 204), then model training program 200 trains the RBM with an unsupervised method. As would be recognized by one skilled in the art, an unsupervised method tries to find hidden structure in unlabeled data and includes an algorithm with no target value, i.e., there is no error or reward signal to evaluate a potential solution. Instead, the algorithm has a halting criterion. Examples of halting criteria include, but are not limited to, precision, recall, accuracy, number of cycles, and time. An unsupervised method is advantageous for use in model training when the only data available is unlabeled data.

Responsive to training the RBM with a supervised or an unsupervised method, model training program 200 places the RBM in a stack of RBMs (step 210). Stacking RBMs, as is known in the art, creates a multi-layer model where output from a first layer becomes input for a layer stacked on top of the first layer. In one embodiment, model training program 200 alternates the placement of the even RBMs and the odd RBMs in one stack. In another embodiment, model training program 200 creates a layer with a pair of odd and even RBMs. The first RBM trained becomes the first of a stack.

Responsive to stacking both odd and even RBMs, model training program 200 determines whether the desired recall is obtained (decision block 212). Desired recall is a criteria used to determine whether cognitive model 118 minimizes the number of missed or mistaken predictions. Model training program 200 tests both supervised and unsupervised RBMs with labeled data, simulating a real use case. If the desired recall of the testing is not obtained ("no" branch, decision block 212), then model training program 200 returns to decision block 204 and adds additional RBMs to cognitive model 118.

If the desired recall of the testing is obtained ("yes" branch, decision block 212), then model training program 200 creates associative layers of stacked, labeled RBMs (step 214). Model training program 200 creates associative layers of two or more stacked RBMs created from image feature vectors and also creates associative layers of two or more stacked RBMs created from textual feature vectors. Model training program 200 creates the associative layers with supervised learning using labels of opposite meaning. In one embodiment, the labels may be "critical" and "not critical." Model training program 200 can associate any number of independent RBMs together.

Model training program 200 performs supervised training with the associative layers (step 216). Model training program 200 takes the output from the associative layers of two or more stacked RBMs created from image feature vectors and from the associative layers of two or more stacked RBMs created from textual feature vectors, using the labels "critical" and "not critical," to perform supervised training of cognitive model 118. As would be recognized by one skilled in the art, the supervised training determines the difference between a prediction and a target, i.e., the error, and back propagates the difference through the layers such that cognitive model 118 "learns."

Model training program 200 determines whether the correct precision is obtained (decision block 218). Model training program 200 tests cognitive model 118 with simulated data of a real use case to determine whether the correct precision is obtained. The correct precision is based on a ground truth, i.e., an answer key, which defines the correct answer. By determining whether the correct precision is obtained, model training program 200 minimizes the number of times cognitive model 118 predicts a false positive result. If the correct precision is not obtained ("no" branch, decision block 218), then model training program 200 continues to train cognitive model 118 by returning to step 216. If the correct precision is obtained ("yes" branch, decision block 218), then cognitive model 118 is ready and model training program 200 ends the training.

Figure 3:
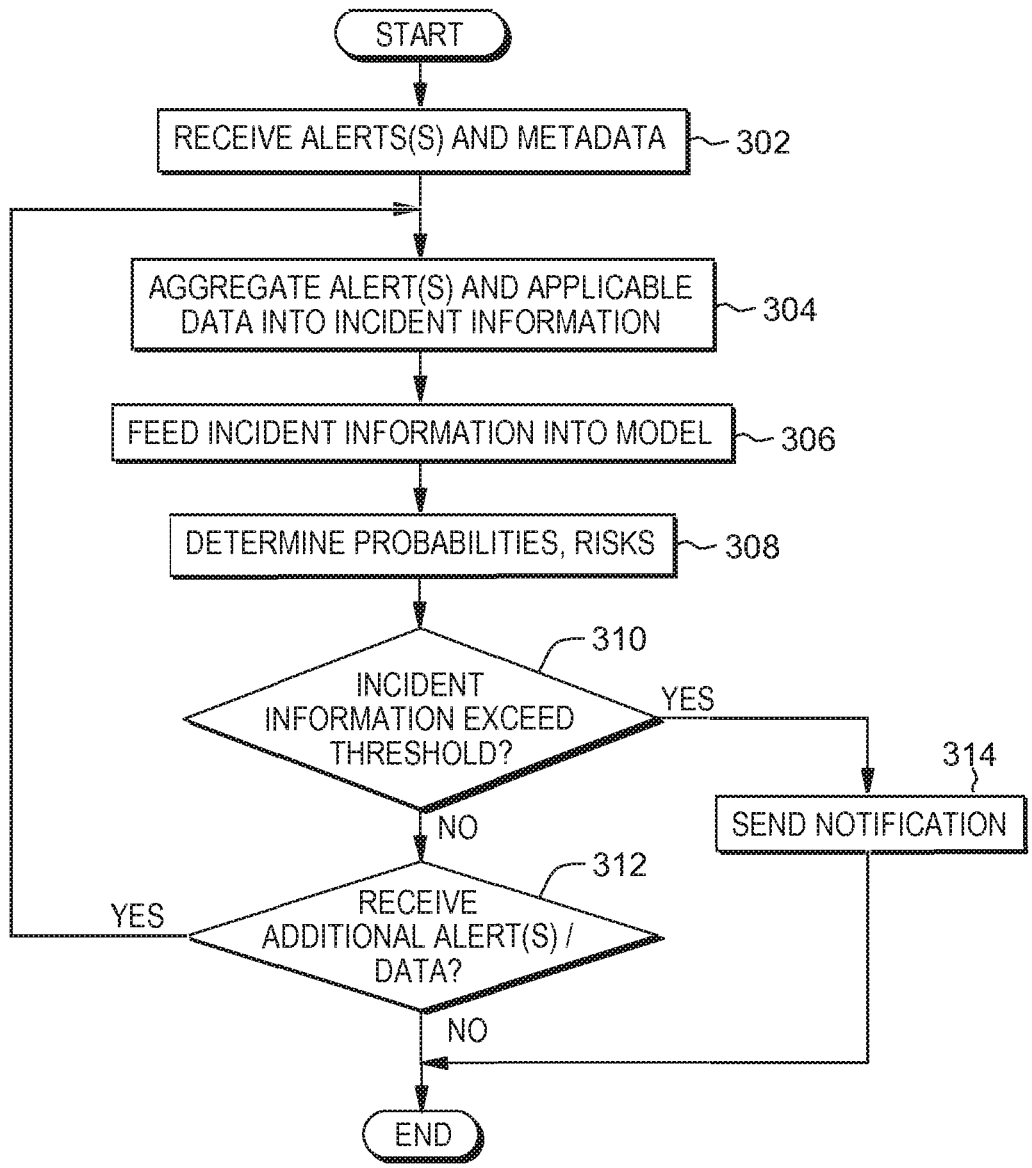
FIG. 3 is a flowchart depicting operational steps of an incident predictor program, on the computer within the computational environment of FIG. 1, for predicting and responding to incidents, in accordance with an embodiment of the present invention.

FIG. 3 is a flowchart depicting operational steps of incident predictor program 116, on computer 114 within computational environment 100 of FIG. 1, for predicting and responding to incidents, in accordance with an embodiment of the present invention.

Incident predictor program 116 receives one or more alerts and associated metadata (step 302). When one or more observers sends an alert regarding a critical incident, which may be an alarm or a status message that includes or describes the type of incident, via incident alert application 108 or via a posting on social network application 106, incident predictor program 116 receives the alert. For example, a user of client computing device(s) 104 may send an alert, via incident alert application 108, describing gathering storm clouds which may become a tornado. In one embodiment, incident predictor program 116 continuously monitors social network application 106 for all user postings and determines which postings contain information regarding critical incidents. In the embodiment, incident predictor program 116 may analyze text or images or both as part of the determination. In another embodiment, social network application 106 may be a specific page or group where users post information regarding observed or potential incidents. In a further embodiment, if incident predictor program 116 receives only one incident alert, incident predictor program 116 may query social network application 106 to determine whether additional observers have posted information corresponding to the incident. Incident predictor program 116 also receives any available metadata associated with the alert. Metadata associated with an alert may be, for example, the location of the device from which the observer sent the alert, the device identification, the device battery status, identification of the observer or the owner of the device. With the identification of the observer, additional metadata may include background information of the observer, including, but not limited to, a history of previously sent alerts or a history of any education or training received regarding the type of incident in the alert, including the observer's profession. The advantage of receiving a history of the observer's previous alerts and/or training is that the history may indicate the quality or reliability of the information included in the alert. For example, if the alert is in reference to a tornado, metadata of the alert may include the fact that the observer is a trained meteorologist, and is therefore likely more qualified to provide reliable information on a potential tornado incident. In an embodiment, background information of the observer may be stored in database 120. In addition, if the observer's device, i.e., client computing device(s) 104, includes biometric sensor(s) 110, then the metadata may also include biometric information about the observer, including, but not limited to, heart rate, heart rate variability, gait, blood pressure, and respiration. The advantage of receiving biometric information is that biometric information may indicate the physical state of the observer which can be an indication of the urgency of the situation in addition to the reliability of the information. For example, if an observer has an elevated heart rate, the information the observer provides may be exaggerated due to the observer's reaction to the incident.

Incident predictor program 116 aggregates the one or more alerts and additional applicable data into incident information (step 304). Aggregating, as referenced herein, refers to collecting and combining the one or more alerts with additional applicable data, the result of which is data referred to as incident information. Incident predictor program 116 aggregates the alerts from one or more observers and the associated metadata with a plurality of other applicable data, stored in database 120, which may be useful in assessing a critical incident. In one embodiment, incident predictor program 116 may also extract applicable data from additional sources (not shown), via network 102. Applicable data may include, but is not limited to, weather conditions in the area of the incident, current population of the area of the incident, historical accounts of similar incidents, schedules of public transportation and events in the area of the incident, status of security systems and personnel, and the like. The result of the aggregation of data is a corpus of incident information which describes the critical incident, or the potential of a critical incident, with information known at the time incident predictor program 116 receives the alerts.

Incident predictor program 116 feeds the incident information into cognitive model 118 (step 306). Cognitive model 118 processes the incident information to evaluate the incident. By assessing each component of the incident information, utilizing the training set of labelled data, and assigning weights to the various components, based on the quality, reliability, and urgency of the data, cognitive model 118 characterizes the current state of the incident and calculates a prediction of a likely outcome as well as a course of action. Continuing the previous example, cognitive model 118 may include the historical weather data of the area from which the observer sent the alert sent as well as current weather data, as received from sensor(s) 112, and assign a weight or probability to the occurrence of a tornado at the time and place from which the alert originated.

Incident predictor program 116 determines the probabilities and risks associated with the incident (step 308). Via the output of cognitive model 118, incident predictor program 116 determines the probability of a critical incident occurring, or, if the critical incident is in progress, and the probability of various outcomes. Incident predictor program 116 processes the weights and probabilities which cognitive model 118 calculated and assigned to the various components of incident information to determine the likelihood of a critical incident occurring. Incident predictor program 116 also determines the risks, if any, to the observers or other people or property in the vicinity of the incident. For example, if incident predictor program 116 determines a critical incident occurring is highly probable, then incident predictor program 116 also determines the probability of whether people are at risk of injury or if property is at risk of damage, depending on the type of incident and/or the location of the incident. It is advantageous to determine the probabilities and risks associated with the incident because if an incident is low risk, then people need not be alarmed, but if an incident is high risk, then notification can minimize damage to people or property in the vicinity of the incident.

Incident predictor program 116 determines whether the incident information exceeds a threshold (decision block 310). Incident predictor program 116 compares the probabilities and risks determined in step 308 to a pre-defined critical threshold for probability and/or risk to determine whether the incident information supports sending one or more notifications with respect to the incident. In one embodiment, the pre-defined critical threshold is a percentage, and incident predictor program 116 compares probabilities, calculated as a percentage, to the threshold percentage. In an embodiment, the critical threshold may be defined based on the type or severity of the incident. For example, if the incident is a tornado, with a high probability of damage, then the pre-defined critical threshold will be lower than if the incident is a two-car collision on a rural road. In another embodiment, the critical threshold may be defined based on the location of the incident. For example, if the incident is in a crowded city, with possible impact to a large number of people, then the pre-defined critical threshold will be lower than if the incident is in a sparsely populated area. If incident predictor program 116 determines the incident information does not exceed the threshold ("no" branch, decision block 310), then incident predictor program 116 determines whether additional alerts and/or applicable data are received (decision block 312). Incident predictor program 116 determines whether additional alerts or status messages, and the associated metadata, are received from observers. In one embodiment, incident predictor program 116 receives additional alerts from the same or additional observers or authorities, via incident alert application 108. In another embodiment, incident predictor program 116 receives additional alerts from postings of observers or authorities on social network application 106. In a further embodiment, incident predictor program 116 queries observers or authorities for additional details of the incident and receives additional alerts as responses to the queries.

If incident predictor program 116 determines that additional alerts or data are not received ("no" branch, decision block 312), then incident predictor program 116 takes no further action and ends, having determined that there is not sufficient information to support additional actions. If incident predictor program 116 determines that additional alerts or data are received ("yes" branch, decision block 312), then incident predictor program 116 returns to step 304 and aggregates the new data with the previously aggregated incident information. As new alerts and data are received, incident predictor program 116 iteratively re-weights the probability of a critical incident and any weighted alternatives. It is advantageous to receive additional alerts and data because adding the additional incident information may cause the incident information to exceed the threshold, and thereby initiate further actions.

If incident predictor program 116 determines the incident information does exceed the threshold ("yes" branch, decision block 310), then incident predictor program 116 sends a notification (step 314). If, based on the incident information, incident predictor program 116 determines a critical incident is imminent or occurring, then incident predictor program 116 sends one or more notifications to a plurality of stakeholders. The advantage of sending a notification to a plurality of stakeholders is enabling the stakeholders to take appropriate action in response to information associated with the incident. Incident predictor program 116 may determine the stakeholders based on one or more of a plurality of criteria. In one embodiment, incident predictor program 116 may determine the stakeholders based on the type of incident. In another embodiment, incident predictor program 116 may determine the stakeholders based on the location of the incident. In one embodiment, users of incident alert application 108 register with incident predictor program 116 such that incident predictor program 116 can easily determine whether the user is an incident stakeholder, based on the user's profile or current location. In another embodiment, incident predictor program 116 may determine the stakeholders based on a query of social network application 106 or of the Internet. For example, incident predictor program 116 may send a notification to security personnel, police, firefighters, ambulance drivers, hospitals, and the like, to alert them of the situation and suggest preparations and/or actions to take. In another example, incident predictor program 116 may send a notification to devices of observers in the area in response to the observers' alerts and status messages, giving one or more recommendations of how to proceed. In a further example, incident predictor program 116 may send a notification to all residents within a defined radius of the incident, instructing them to be on the lookout for the incident or to evacuate the area. In one embodiment, incident predictor program 116 sends the notification via social network application 106. In another embodiment, incident predictor program 116 sends the notification via incident alert application 108. In a further embodiment, incident predictor program 116 may send the notification by sending a voice message to public loud speakers in the area or triggering an emergency alert broadcast on television and/or cellular networks.

Figure 4:
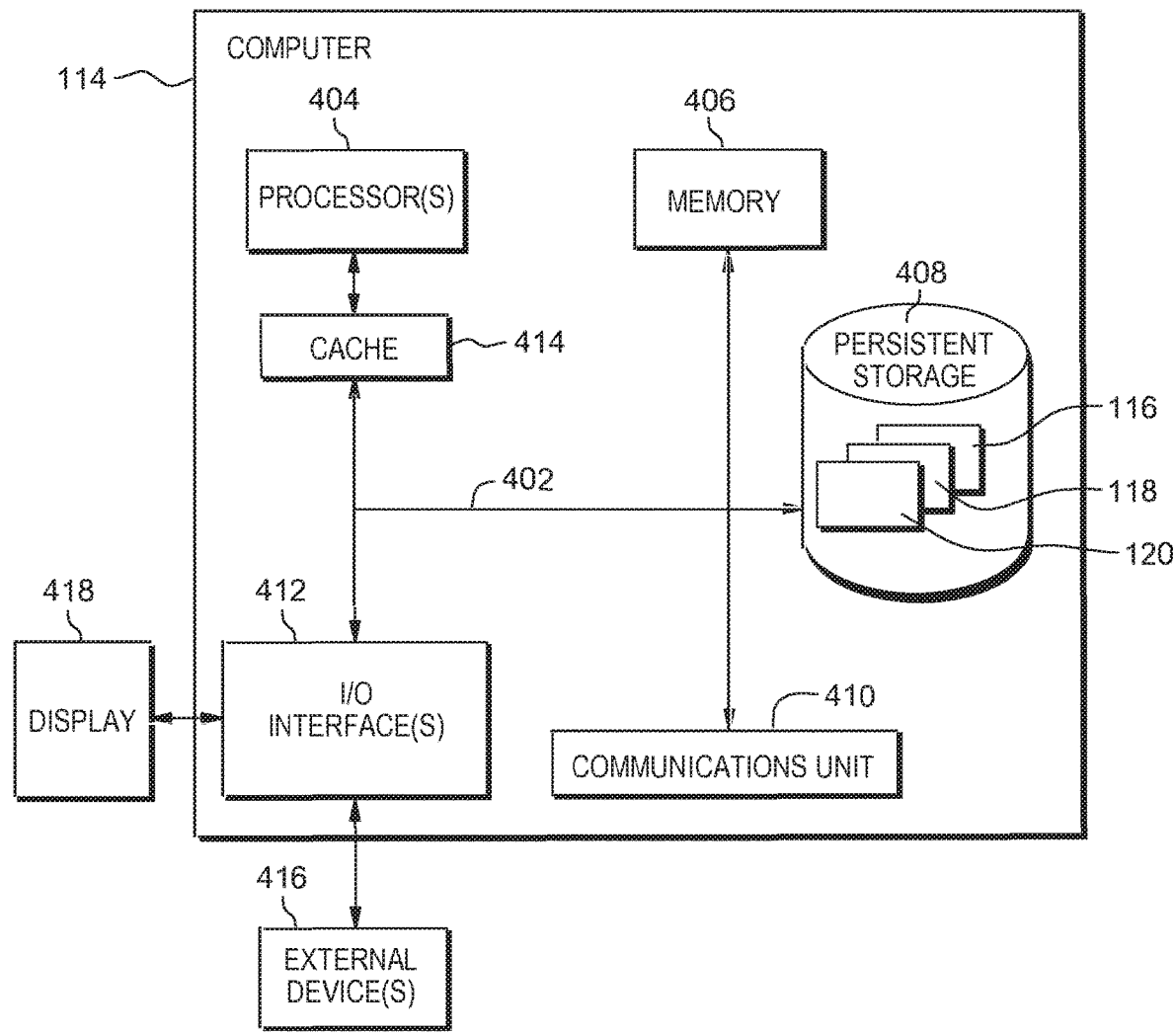
FIG. 4 depicts a block diagram of components of the computer executing the incident predictor program within the computational environment of FIG. 1, in accordance with an embodiment of the present invention.

FIG. 4 depicts a block diagram of components of computer 114 within computational environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computer 114 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., incident predictor program 116, cognitive model 118, and database 120 are stored in persistent storage 408 for execution and/or access by one or more of the respective processor(s) 404 of computer 114 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device(s) 104 and sensor(s) 112. In these examples, communications unit 410 includes one or more network interface cards. Communications unit 410 may provide communications through the use of either or both physical and wireless communications links. Incident predictor program 116, cognitive model 118, and database 120 may be downloaded to persistent storage 408 of computer 114 through communications unit 410.

I/O interface(s) 412 allows for input and output of data with other devices that may be connected to computer 114. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., incident predictor program 116, cognitive model 118, and database 120 on computer 114, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for incident prediction and response, the method comprising:
    receiving, by one or more computer processors, one or more alerts corresponding to an incident, wherein the one or more alerts are one or more status messages received from one or more observers;
    aggregating, by the one or more computer processors, the one or more alerts with additional data corresponding to the incident;
    feeding, by the one or more computer processors, the aggregated data into a prediction model, wherein training of the prediction model uses associated independent stacked Restricted Boltzmann Machines utilizing one or more supervised methods and one or more unsupervised methods;
    determining, by the one or more computer processors, based, at least in part, on one or more calculations by the prediction model, at least one probability of the incident;
    determining, by the one or more computer processors, whether the at least one probability exceeds a pre-defined threshold; and
    responsive to determining the at least one probability exceeds a pre-defined threshold;
    sending, by the one or more computer processors, at least one notification.

2. The method of claim 1, wherein the at least one probability of the incident includes a probability of the incident occurring in the future.

3. The method of claim 1, wherein the at least one probability of the incident includes a probability of one or more outcomes of the incident.

4. The method of claim 1, wherein the at least one probability of the incident includes a probability of one or more risks to people or property associated with the incident.

5. The method of claim 1, wherein the at least one probability of the incident includes a probability of the incident occurring at a time the one or more alerts are received.

6. The method of claim 1, wherein the at least one probability of the incident includes a probability of the incident becoming of decisive importance with respect to an outcome.

7. The method of claim 1, wherein the one or more alerts include metadata corresponding to the one or more alerts.

8. The method of claim 7, wherein metadata corresponding to the one or more alerts includes: a location of a device from which an observer sends an alert, an identification of the device, a device battery status, an identification of an observer of the incident, an identification of an owner of the device, a background information of an observer, a history of an observer's previously sent alerts, a history of an observer's received education associated with a type of incident in the alert, an observer's profession, a heart rate, a heart rate variability, a gait, a blood pressure, a respiration, an oxygen saturation, or a physical characteristic of an observer.

9. The method of claim 1, wherein additional data corresponding to the incident includes: a weather condition in an area of the incident, a current population of an area of the incident, one or more historical accounts of similar incidents, one or more schedules of public transportation in an area of the incident, one or more schedules of one or more events in an area of the incident, a status of security systems corresponding to an area of the incident, or a status of personnel corresponding to an area of the incident.

10. The method of claim 1, wherein the at least one notification includes at least one of: a probability of an incident occurring, a status of an incident, or instructions for actions to take corresponding to an incident.

11. A computer program product for incident prediction and response, the computer program product comprising:
one or more computer readable storage device and program instructions stored on the one or more computer readable storage device, the stored program instructions comprising:
program instructions to receive one or more alerts corresponding to an incident, wherein the one or more alerts are status messages received from one or more observers;
program instructions to aggregate the one or more alerts with additional data corresponding to the incident;
program instructions to feed the aggregated data into a prediction model, wherein training of the prediction model uses associated independent stacked Restricted Boltzmann Machines utilizing one or more supervised methods and one or more unsupervised methods;
program instructions to determine, based, at least in part, on one or more calculations by the prediction model, at least one probability of the incident;
program instructions to determine whether the at least one probability exceeds a pre-defined threshold; and
responsive to determining the at least one probability exceeds a pre-defined threshold, program instructions to send at least one notification.

12. The computer program product of claim 11, wherein the one or more alerts include metadata corresponding to the one or more alerts.

13. The computer program product of claim 12, wherein metadata corresponding to the one or more alerts includes: a location of a device from which an observer sends an alert, an identification of the device, a device battery status, an identification of an observer of the incident, an identification of an owner of the device, a background information of an observer, a history of an observer's previously sent alerts, a history of an observer's received education associated with a type of incident in the alert, an observer's profession, a heart rate, a heart rate variability, a gait, a blood pressure, a respiration, an oxygen saturation, or a physical characteristic of an observer.

14. The computer program product of claim 11, wherein additional data corresponding to the incident includes: a weather condition in an area of the incident, a current population of an area of the incident, one or more historical accounts of similar incidents, one or more schedules of public transportation in an area of the incident, one or more schedules of one or more events in an area of the incident, a status of security systems corresponding to an area of the incident, or a status of personnel corresponding to an area of the incident.

15. The computer program product of claim 11, wherein the at least one notification includes at least one of: a probability of an incident occurring, a status of an incident, or instructions for actions to take corresponding to an incident.

16. A computer system for incident prediction and response, the computer system comprising:
one or more computer processors;
one or more computer readable storage device;
program instructions stored on the one or more computer readable storage device for execution by at least one of the one or more computer processors, the stored program instructions comprising:
program instructions to receive one or more alerts corresponding to an incident, wherein the one or more alerts are status messages received from one or more observers;
program instructions to aggregate the one or more alerts with additional data corresponding to the incident;
program instructions to feed the aggregated data into a prediction model, wherein training of the prediction model uses associated independent stacked Restricted Boltzmann Machines utilizing one or more supervised methods and one or more unsupervised methods;
program instructions to determine, based, at least in part, on one or more calculations by the prediction model, at least one probability of the incident;
program instructions to determine whether the at least one probability exceeds a pre-defined threshold; and
responsive to determining the at least one probability exceeds a pre-defined threshold, program instructions to send at least one notification.

17. The computer system of claim 16, wherein the one or more alerts include metadata corresponding to the one or more alerts.

18. The computer system of claim 17, wherein metadata corresponding to the one or more alerts includes: a location of a device from which an observer sends an alert, an identification of the device, a device battery status, an identification of an observer of the incident, an identification of an owner of the device, a background information of an observer, a history of an observer's previously sent alerts, a history of an observer's received education associated with a type of incident in the alert, an observer's profession, a heart rate, a heart rate variability, a gait, a blood pressure, a respiration, an oxygen saturation, or a physical characteristic of an observer.

19. The computer system of claim 16, wherein additional data corresponding to the incident includes: a weather condition in an area of the incident, a current population of an area of the incident, one or more historical accounts of similar incidents, one or more schedules of public transportation in an area of the incident, one or more schedules of one or more events in an area of the incident, a status of security systems corresponding to an area of the incident, or a status of personnel corresponding to an area of the incident.

20. The computer system of claim 16, wherein the at least one notification includes at least one of: a probability of an incident occurring, a status of an incident, or instructions for actions to take corresponding to an incident.

* * * * *